Patented May 13, 1941

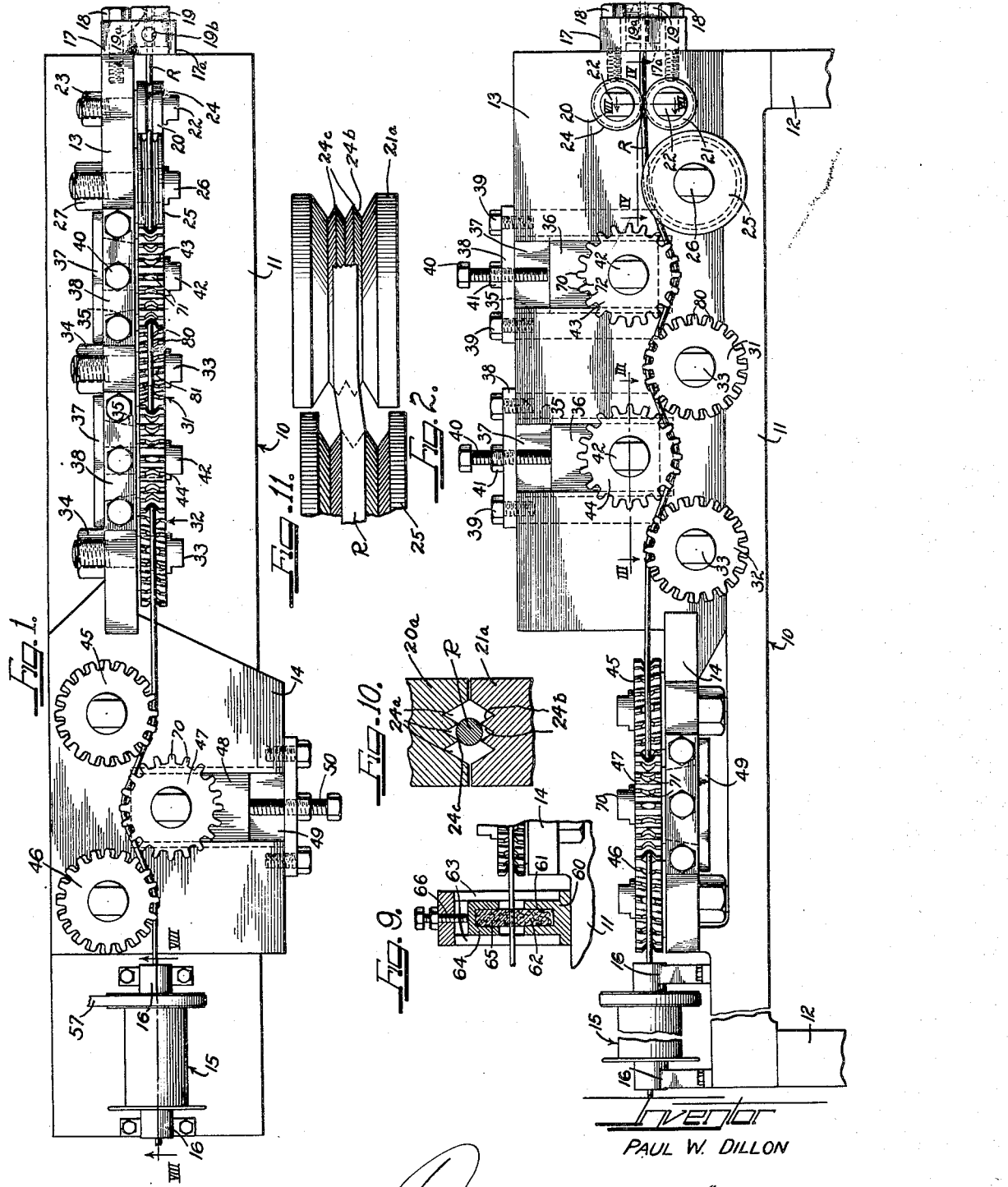

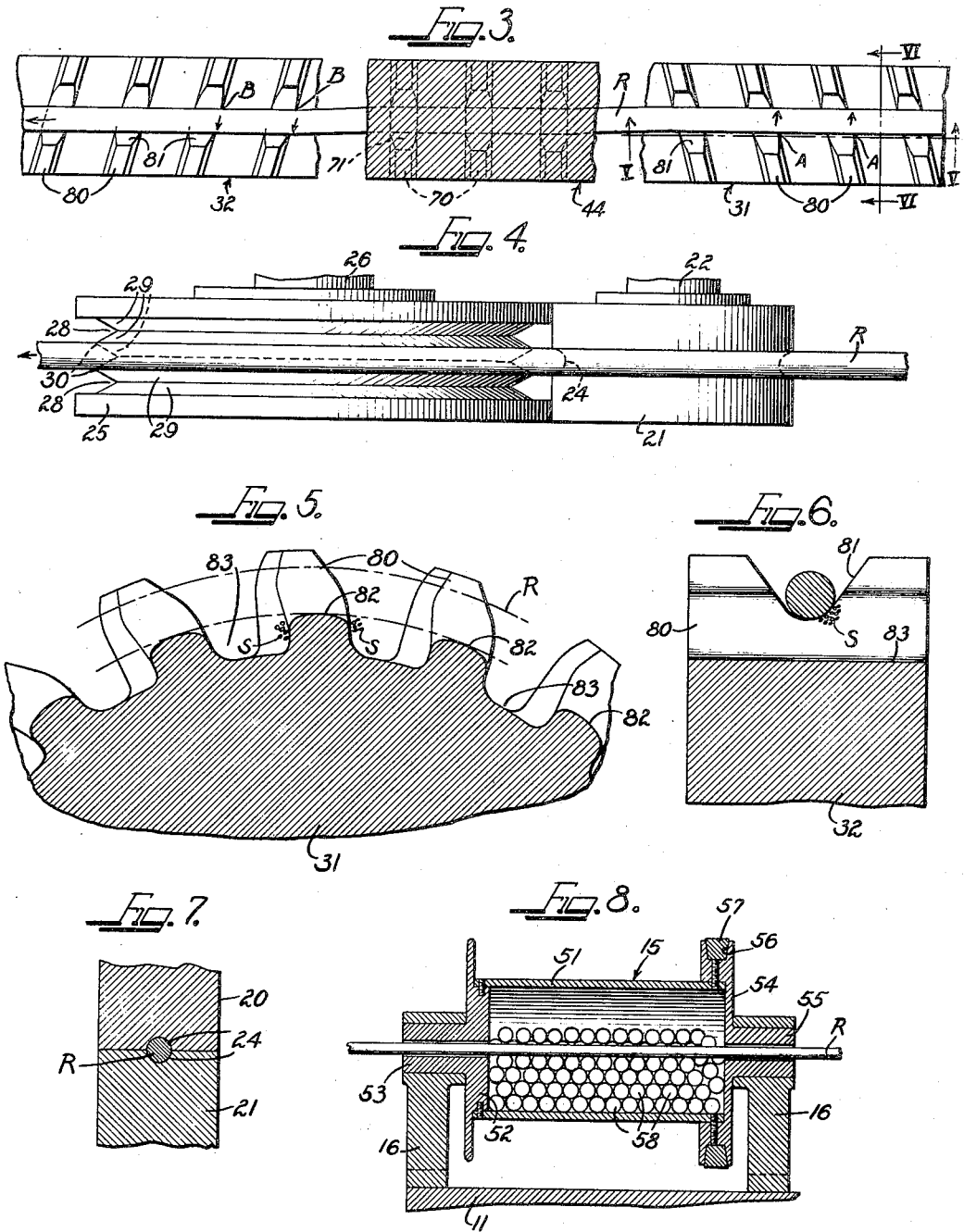

2,242,024

UNITED STATES PATENT OFFICE 2,242,024

MACHINE FOR REMOVING SCALE FROM RODS

Paul W. Dillon, Sterling, Ill., assignor to Northwestern Steel and Wire Company, Sterling, Ill., a corporation of Illinois Application December 20, 1939, Serial No. 310,116

12 Claims. (Cl. 29—81)

This invention relates to machines for flexing metal rods to crack off scale from the surfaces of the rods.

More particularly the invention relates to descaling machines having gear-like sheaves to crack and loosen scale from the surfaces of metal rods and wires.

Mechanical descaling machines for flexing and distorting metal rods or wires to crack off and loosen scale and other surface impurities from the rods or wires have heretofore employed grooved sheaves having continuous surfaces for receiving the rods. Some of these descaling machines have been equipped with rotary brushes acting on the rod after passage through the distorting sheave wheel assembly of the machine to brush off the loosened surface impurities.

According to this invention, descaling machines are now provided with toothed sheaves for distorting the rods to crack scale therefrom and the loosened scale remaining on the rod after passage through the toothed sheave assembly of the machine can be removed from the rod by a rotary ball mill or a stationary wiper device mounted on the machine.

The toothed sheaves are provided with crowned grooves for supporting and guiding the rod. The loosened scale falls freely from the rod into the spaces between the teeth since the bottoms of the grooves are above the bottoms of the teeth.

In a preferred embodiment of the invention the teeth in adjacent sheaves are oppositely inclined so that the wire is distorted in two directions as it passes over the sheaves. The inclined teeth serve to throw the rod to one side of the grooves and, by inclining the teeth in opposite directions on adjacent sheaves, the wire is thrown from one side to another.

Another preferred embodiment of the invention includes the use of a scarifying sheave wheel having a circumferentially grooved periphery with a ridged bottom having sharp edges for scarifying the rod.

It is, then, an object of the invention to provide a mechanical descaling machine with improved sheaves for cracking off scale from wire or rod passed through the machine.

A further object of the invention is to provide toothed sheaves for a rod cleaning machine.

Another object of the invention is to provide a mechanical rod cleaning machine which flexes the rods in two directions at the same time to crack off surface impurities from the rod.

A specific object of the invention is to provide an inexpensive rod descaling machine having a plurality of toothed sheaves arranged in vertical alignment and a plurality of toothed sheaves arranged in horizontal alignment.

Another specific object of the invention is to provide, in a descaling machine, a ball mill or wiping device for removing loosened scale or dust from the rod passing through the machine.

Other and further objects of the invention will become apparent to those skilled in the art from the following detailed description of the annexed sheets of drawings which disclose preferred embodiments of the invention.

On the drawings:

Figure 1 is a top plan view of a descaling machine according to this invention.

Figure 2 is a side elevational view of the machine shown in Figure 1.

Figure 3 is a greatly enlarged fragmentary cross-sectional view taken along the line III—III of Figure 2.

Figure 4 is an enlarged fragmentary plan view taken along the line IV—IV of Figure 2.

Figure 5 is a further enlarged cross-sectional view taken along the line V—V of Figure 3.

Figure 6 is an enlarged cross-sectional view taken along the line VI—VI of Figure 3.

Figure 7 is an enlarged fragmentary cross-sectional view taken along the line VII—VII of Figure 2.

Figure 8 is an enlarged cross-sectional view taken along the line VIII—VIII of Figure 1.

Figure 9 is a fragmentary cross-sectional view of a wiper device adapted to be used in place of the device shown in Figure 8.

Figure 10 is a fragmentary cross-sectional view, similar to Figure 7, but illustrating a modified form of guide wheels for the machine.

Figure 11 is a fragmentary plan view, similar to Figure 4, but illustrating the manner in which one of the modified guide wheels shown in Figure 10 cooperates with the adjacent sheave of the machine.

As shown on the drawings:

In Figures 1 and 2 the reference numeral 10 designates generally a rod descaling machine of this invention. The machine 10 comprises a table 11 supported on legs or standards 12. The table 11 carries a vertical plate 13 at one end thereof, a horizontal plate 14 intermediate the ends thereof, and a ball mill 15 at the other end thereof. The ball mill 15 is rotatably mounted on the table 11 in standards 16.

A block 17 is bolted to the side of the plate 13 at the inlet end of the machine 10, by means of bolts 18. The block 17 has an apertured portion 17a projecting from a face of the plate 13. The aperture of this projecting portion 17a receives a rod guide 19 having a bore 19a therethrough for directing the rod R into the machine. A bolt or locking pin 19b can serve to hold the guide 19 in the aperture 17a of the supporting block 17.

A pair of superimposed guide or feed wheels 20 and 21 are rotatably mounted on bolts 22 extending through the vertical plate 13. The bolts 22 are secured to the plates by means of nuts such as 23.

Each wheel 20 and 21 has a circumferential groove 24 therein adapted to snugly receive the rod R. The wheels 20 and 21 are mounted in alignment with the bore 19a of the guide 19 and the rod passes between the wheels as shown in Figure 7.

If desired, instead of having single grooves 24 in the guide wheels 20 and 21, modified wheels 20a and 21a, shown in Figures 10 and 11 can be used. The modified wheels have a plurality of V-shaped troughs 24a around their circumferences defined by inclined side walls 24b. Pairs of side walls 24b merge into sharp apices 24c providing knife like ridges engaging the rod R at a plurality of points around its periphery as shown in Figure 10. The knife edges scratch or scarify the scale on the rod.

A sheave 25 is rotatably mounted on a bolt 26 extending through the plate 13 and anchored to the plate by means of a nut 27. The sheave 25 is peripherally grooved, as best shown in Figure 4, to provide a plurality of V-shaped troughs 28 around the circumference thereof defined by inclined side walls 29. Pairs of the side walls 29 merge into sharp apices 30 defining knife edge ridges around the sheave. The sheave 25 is so positioned that the rod R passes from the feed wheels 20 and 21 over the top of the sheave as shown in Figures 2 and 4 with the rod resting on the knife edges 30. These knife edges are adapted to scarify or scratch the scale on the rod to facilitate removal of the scale by the distorting or flexing sheaves hereinafter described.

If scarifying guide wheels 20a and 21a are used in place of wheels 20 and 21 their knife edge apices 24c are offset from the knife edge apices 30 of the sheave 25 so as to scratch the rod R at different points on its periphery. The side walls 24b are also out of alignment with the side walls 29 so that the rod R will be distorted horizontally as it passes from the feed wheels to the sheave 25 as shown in Figure 11. This distortion flakes off and loosens some of the scale.

Toothed sheaves 31 and 32 are also rotatably mounted on bolts 33 secured to the plate 13 by means of nuts 34. The sheaves 31 and 32 are in horizontal alignment with the sheave 25 but are spaced apart from each other and from the sheave 25.

The plate 13 has two cut-out portions extending from the top thereof. One of the cut-out portions terminates between the sheave 25 and the sheave 31 while the other cut-out portion terminates between the sheave 31 and the sheave 32. Each cut-out portion has tapered side walls 35 converging toward the front face of the plate. Slide blocks 36 are mounted in the cut-out portions and have tapered side walls in bearing relation with the walls 35. Backing plates 37 are secured to the plate 13 and extend beyond the divergent sides of the cut-out portions to hold the slide blocks in the cut-out portions.

Bars 38 bridge the open tops of the cut-out portions and are bolted to the top edge of the plate 13 by means of bolts 39.

Locking bolts 40 are threaded through the bars 38 and are adapted to thrust against the tops of the blocks 36 for forcing the same downwardly. Locking nuts 41 can be threaded around the bolts 40 for holding the same in adjusted position.

Each block 36 carries a bolt or spindle 42 having a toothed sheave 43 or 44 freely rotatable thereon. The sheaves 43 and 44 are adapted to extend down between the sheaves 25 and 31 and 31 and 32 respectively so as to distort or bend the rod R passing over the sheaves 25, 31 and 32. Manipulation of the locking bolt 40 adjusts the positions of the sheaves 43 and 44 to control the amount of flexing of the rods.

The rod R thus passes along the front face of the plate 13 between the feed wheels 20 and 21, over the scarifying sheave 25, under the bending sheave 43, over the sheave 31, under the bending sheave 44 and over the sheave 32.

The rod then passes over the top of the plate 14. This plate 14 rotatably supports spaced horizontal toothed sheaves 45 and 46 and an intermediate adjustable toothed sheave 47. The sheave 47 is carried on a slide block 48 mounted in a cut-out portion of the plate 14 in a manner identical with the block 38. A backing plate 49 holds the block 48 in the cut-out portion of the plate 14 secured to the plate 14 and a bolt 50 urges the block toward the sheaves 45 and 46 to move the sheave 47 into the space between these sheaves. The rod is thus bent or distorted in a horizontal direction.

After passage over the last sheave 46 the rod is run through the ball mill 15. As best shown in Figure 8, the ball mill 15 comprises a cylinder 51 closed at one end by means of an end wall 52 having an apertured trunnion portion 53 rotatably mounted in a bearing support 16. The other end of the cylinder 51 is closed by a pulley 54 having an apertured trunnion portion 55 rotatably mounted in the other bearing support 16. The pulley 54 has a grooved periphery 56 receiving a belt 57 for rotating the ball mill.

The apertures in the trunnions 53 and 55 are just large enough to accommodate the rod R therethrough. The cylinder 51 is partially filled with steel balls 58 or other free cleaning units such as rods, stones or the like. When the ball mill 15 is rotated by the belt 57 driven from a prime mover (not shown) the balls 58 will tumble around the surface of the rod and free the same from dust or loosened scale particles remaining on the rod.

In place of the ball mill 15, a wiping device shown in Figure 9 may be used. This wiping device comprises a frame 60 mounted on the table 11 having a recess 61 receiving a hard block of asbestos or other wiping material 62 therein. Track bars 63 extend upwardly from the frame 60 and slidably guide a carriage 64 mounted between the bars 63. A second asbestos or other wiping material block 65 is secured in the carriage 64. The blocks 62 and 65 have semi-cylindrical depressions in their mating faces adapted to tightly receive the rod R. A bolt 66 is adapted to urge the carriage 65 downwardly so as to thrust the asbestos block 65 tightly against the top half of the rod R while the bottom half of the rod is tightly seated in the block 62. This wiping device will serve to remove loosened scale dust and flakes still adhering to the rod after the distorting and scarifying operations performed thereon by the sheave wheels.

The slidably mounted sheaves 43, 44 and 47 have straight transverse teeth 70 extending at spaced intervals around the peripheries of the sheaves. Each tooth is centrally grooved as at 71. However, the bottoms of the grooves 71 are not as deep as the bottoms 72 between the teeth, so that, as the rod R is received in the grooves 71, scale dust or flakes cracked off of the rod are free to fall into the lower recesses 72 between the teeth. This construction prevents a packing of scale around the periphery of the sheaves and prevents a recontacting of the scale dust or flakes with the rod.

The rod therefore only has contact with the sheaves at spaced points while the bottoms of the recesses 72 between the teeth on the sheaves serve as wells to receive scale cracked off of the rods.

The sheaves 31, 32, 45 and 46 have teeth 80 around the circumferences thereof but, as best shown in Figures 3 and 5, these teeth 80 do not extend transversely across the sheaves as do the teeth 70, but, on the other hand, they extend obliquely to the axis of the sheave. Helical gears can be used to form the sheaves if desired.

The oblique teeth 80 are centrally grooved as at 81 and the bottoms of the grooves 81 are crowned as shown at 82 in Figure 5 so that the rod R will ride on the high portions of the grooves and permit a free discharge of scale S into the recesses 83 between the teeth. The bottoms of the grooves 82 are spaced outwardly from the bottoms of the recesses 83.

As best shown in Figures 3 and 6, the rod R rides in the grooves 81 but since the teeth 80 defining the grooves 81 are at an obtuse angle to the direction of travel of the rod, the rod will first contact the teeth at points A. This will throw the rod to the other side of the groove 81 so that the rod will ride in the groove against this side wall thereof as best shown in Figure 6. As a result, scale S will be scraped off of the rod along this side and will be free to fall into the recesses 83.

The sheave 44 between the sheaves 31 and 32 as shown in Figure 3 has straight transverse teeth 70 with the centers of the grooves 71 in alignment with the centers of the grooves 81 in the teeth 80. Thus, as the rod passes from the sheave 31 under the sheave 44, it is flexed into the center of the grooves 71 causing a further distortion of the rod.

As also shown in Figure 3, the sheave 32 has the oblique teeth 80 thereof extending in the opposite direction than the teeth 80 of the sheave 31. The rod R, as it passes from the grooves 71 of the teeth 70 and the sheave 44, will first contact the teeth 80 of the sheave 32 at points B. This will urge the rod toward the opposite sides of the grooves 81, causing the rod to ride along side walls of the groove opposite to the side walls on which the rod rode while passing over the sheave 31. As a result the rod will again be flexed horizontally as it passes between the sheave 44 and the sheave 32. Since, of course, the sheave 44 bends the rod vertically, this rod is flexed in two directions at the same time.

If desired, the straight transverse teeth 70 in the adjustably mounted sheaves can be replaced with oblique or helical teeth such as 80 with the teeth engaging the rod so as to throw the same against a side wall of the groove opposite to the side wall on which they rode in the preceding sheave.

The provision of toothed sheaves having grooves with bottoms above the bottoms of the recesses between the teeth facilitates discharge of cracked off scale from the rod. The crowning of the bottoms of the grooves in each tooth further facilitates the scale removal.

The provision of oblique or helical teeth makes possible a shifting back and forth of the rod as it passes through grooves in succeeding sheaves so that the rod will ride against opposite side walls of the groove. This produces a scraping action which increases the scale-removing capacity of the machine.

While the adjustable sheaves 43, 44 and 47 illustrated in the drawings have straight transverse teeth 70, it should be understood that these sheaves can be equipped with oblique or helical teeth such as 80, but slanting in the opposite direction to the direction of slant of the teeth in the preceding sheaves. Furthermore, the helical or oblique teeth in the sheaves 31, 32, 45 and 46 can be replaced with straight transverse teeth.

The rod entering the machine is guided by the guide block 19 into the feed or guide rolls 22 and 21 and thence over the scarifying sheave 25. If desired the guide rolls can also have a scarifying and rod distorting function as shown in Figures 10 and 11. The rod passes over the sheaves 31 and 32 but is distorted in a vertical direction by means of the super-imposed sheaves 43 and 44. After passage over the sheave 32 the rod is deflected in a horizontal direction by means of the sheaves mounted on the horizontal plate 14. The amount of horizontal and vertical deflection of the rod is adjustably and accurately controlled by movement of the adjustable sheaves 43, 44 and 47. Any loosened scale or dust remaining on the rod after the distorting operation is removed by rigid wear resisting solid elements such as balls in the ball mill or hard wiping blocks in a wiper device mounted on the machine.

The machines of this invention are much more efficient than the heretofore-known rod cleaning machines employing solid distorting sheaves.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A rod descaling machine comprising groups of sheaves rotatably mounted in planes at an angle to each other with sheaves of said groups having spaced apart peripheral teeth extending across the width thereof and having aligned central recesses defining a rod receiving peripheral groove around the sheave, at least one toothed sheave of each group having the teeth thereof in angular relation to its rotational axis, and at least one sheave of each group being adjustable in the mounted plane thereof to bend the rod a desired amount in such plane.

2. A rod descaling machine comprising a plurality of sheaves rotatably mounted in a vertical plane, a plurality of sheaves rotatably mounted in a horizontal plane, said sheave assembly adapted to receive a wire rod therethrough for flexing the rod in vertical and horizontal planes, and a sheave having sharp rod-supporting surfaces receiving the rod thereon for guiding the same into said first mentioned sheave assembly.

3. A descaling device comprising a sheave having spaced teeth around the periphery thereof and extending across said periphery in slanting relation to the axis of the sheave, and a groove cut out of each tooth adapted to receive a rod to be descaled therein.

4. In a rod descaling machine the improvement which comprises a rotatable sheave having a plurality of spaced teeth around the periphery thereof, said teeth having central recesses therein terminating above the bases of the teeth for accommodating a rod.

5. A descaling sheave wheel comprising a circular metal member having spaced teeth projecting from the circumference thereof and each of said teeth having a peripheral groove therein terminating above the bases of the teeth.

6. A descaling sheave comprising a circular metal member having radially extending teeth around the periphery thereof in oblique relation to the axis of the member, and each of said teeth having a peripheral groove therein terminating in spaced relation from the base of the tooth.

7. A rod descaling device comprising a gear wheel having a cut-out portion in each tooth thereof defining a channel for receiving a rod, said cut-out portion terminating in spaced relation from the base of the tooth and being tapered toward the sides of the teeth to provide a crown portion for receiving the metal rod thereon.

8. In a rod descaling device including a plurality of rotatably mounted sheaves adapted to distort the rod to crack scale from its surface, the improvement which comprises spaced teeth around the peripheries of said sheaves having grooves therein for receiving said rod and means for causing the rod to ride along a side wall of the grooves.

9. In a rod descaling device including a sheave assembly for flexing the rod to crack scale therefrom, the improvement which comprises spaced teeth around the peripheries of said sheaves having grooves therein receiving the rod, the teeth in successive sheaves extending in opposite directions to throw the rod from one side to the other side of said grooves and thereby enhance the scale-cracking operation with a scale scraping off operation.

10. A descaling sheave comprising a circular metal member having a peripheral rod-receiving groove and slots cut in the periphery of said member beneath the bottom of said groove to facilitate discharge of cracked off scale out of the groove.

11. In a rod descaling machine the improvement which comprises adjoining scarifying wheels having knife edged rod engaging ridges to scratch scale on the rod, said wheels having misaligned rod receiving grooves to distort the rod as it passes between the wheels.

12. In a descaling machine the improvement which comprises adjoining descaling sheaves having misaligned rod-receiving peripheral grooves lying in different planes to distort the rod as it passes between the sheaves.

PAUL W. DILLON.